Nov. 11, 1969    J. A. FLORKOWSKI    3,477,577
CONTROL DEVICE FOR ALTERNATELY OPERATING DUAL LIQUID FILTERS
Filed April 1, 1968    3 Sheets-Sheet 1

INVENTOR
JOHN ANTHONY FLORKOWSKI
BY
ATTORNEY

Nov. 11, 1969  J. A. FLORKOWSKI  3,477,577
CONTROL DEVICE FOR ALTERNATELY OPERATING DUAL LIQUID FILTERS
Filed April 1, 1968  3 Sheets-Sheet 2
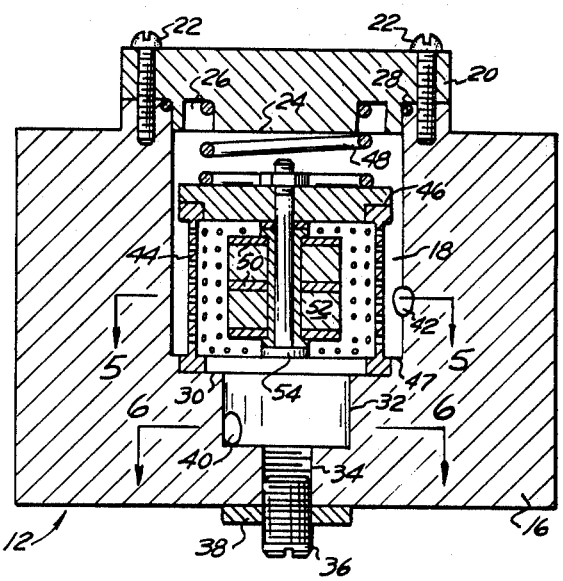
FIG.3
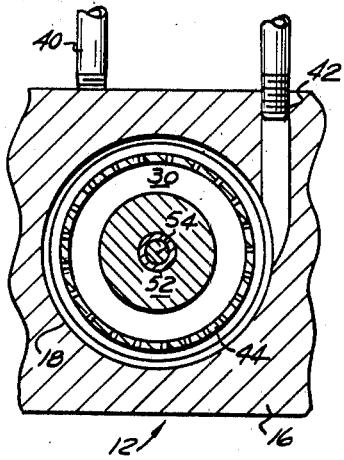
FIG.5
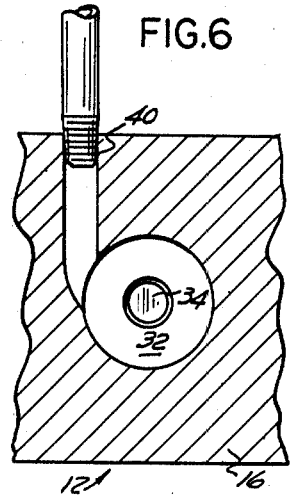
FIG.6
FIG.4
INVENTOR
JOHN ANTHONY FLORKOWSKI
BY
ATTORNEY INVENTOR
JOHN ANTHONY FLORKOWSKI
BY *Adolph G. Martin*
ATTORNEY

3,477,577
CONTROL DEVICE FOR ALTERNATELY OPERATING DUAL LIQUID FILTERS
John Anthony Florkowski, Dearborn Heights, Mich., assignor to John A. Juskevic, Dearborn, Mich.
Filed Apr. 1, 1968, Ser. 717,519
Int. Cl. B01d 29/38
U.S. Cl. 210—108                                   7 Claims

ABSTRACT OF THE DISCLOSURE

A device for controlling dual liquid filters which alternately places the filters in operation by automatically switching fluid flow from a filter, when the filtering element therein becomes partially clogged, and simultaneously therewith directing flow through the other filter, so that the inactive filter may be cleaned without interrupting flow through the hydraulic system.

BACKGROUND OF THE INVENTION

This invention relates liquid filters generally, but more particularly to automatic control device for operating dual liquid filters. Most industrial hydraulic systems are equipped with filtering equipment for removing foreign solids from the working fluid; however, such equipment is usually incapable of maintaining a constant working pressure as the filtering elements become loaded with impurities. Furthermore, provision is rarely made for conveniently cleaning or changing the filtering elements without interrupting flow through the hydraulic system.

SUMMARY OF THE INVENTION

The invention comprises a control device 10 for use in conjunction with a pair of filters 12 and 14 which may be installed either in close proximity thereto or in remote locations. The control device 10 consists of a housing 56 containing an automatic switching unit 58, and a manual selector 60. The automatic switching unit 58 has a valve for selectively directing flow through the two filters 12 and 14, and locking means for the valve controlled by a piston 168. The piston 168 is actuated, when the pressure differential across the filtering element 44 in the acting filter exceeds a pre-selected magnitude, so as automatically to withdraw such partially clogged filter from operation, and simultaneously therewith introduce the other filter into the hydraulic circuit.

BRIEF DESCRIPTION OF THE DRAWING

FIGURE 3 is a section view, taken substantially on plane 3—3 in FIGURE 1, showing internal construction of the filters 12 and 14.

FIGURE 4 is a section view, taken substantially on plane 4—4 in FIGURE 1, showing internal construction of the control device 10.

FIGURE 5 is a section view, taken substantially on plane 5—5 in FIGURE 3, showing the discharge opening 42 in the filter 12.

FIGURE 6 is a section view, taken substantially on plane 6—6 in FIGURE 3, showing the intake opening 40 in the filter 12.

DESCRIPTION OF THE PREFERRED EMBODIMENT

Construction

Figures 1, 2:
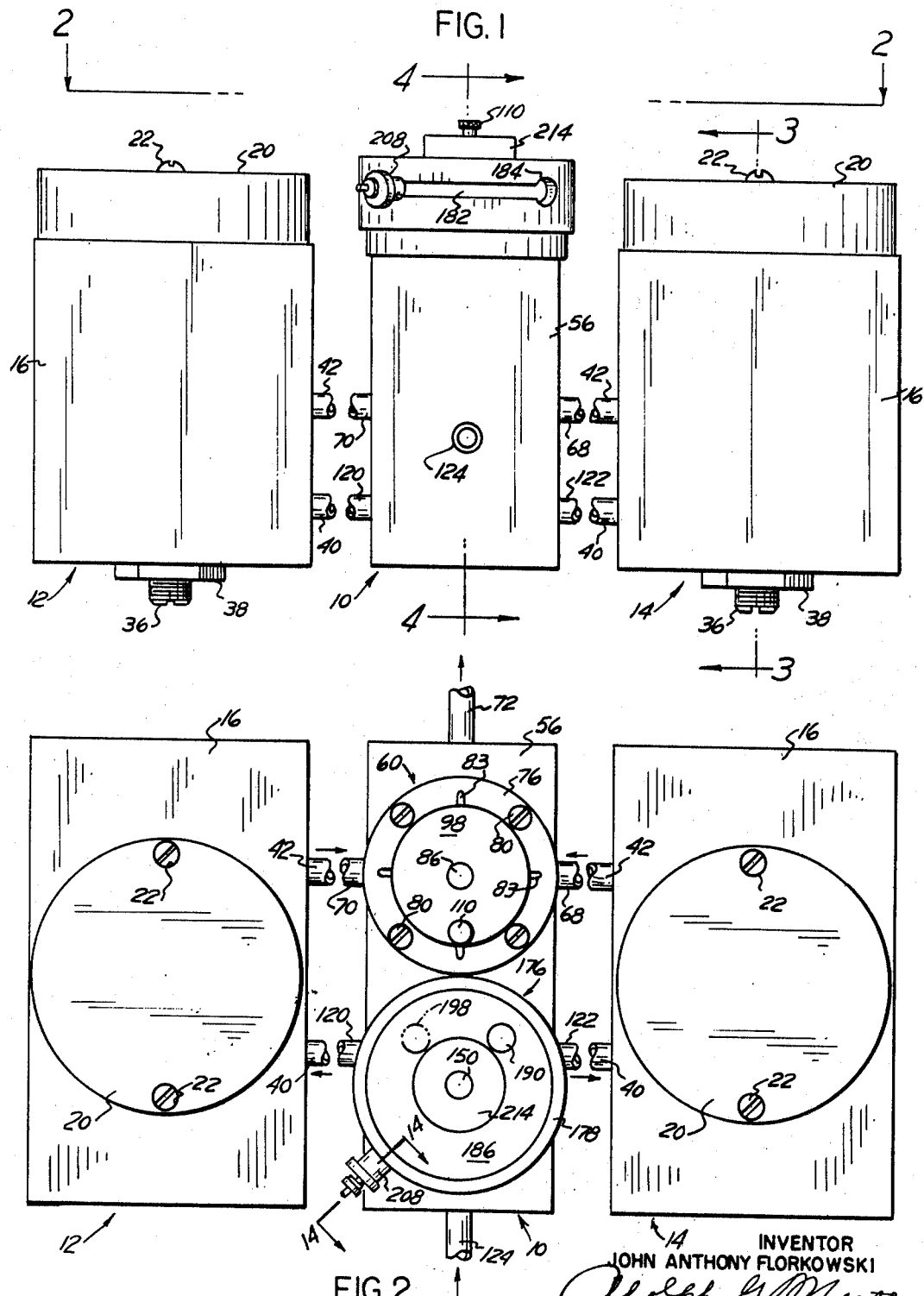
FIGURE 1 is a side elevation view of the applicant's control device 10 and two filters 12 and 14 which it operates.
FIGURE 2 is a plan view of the control device 10 and filters 14 and 12, taken substantially on a plane 2—2 in FIGURE 1, showing the characteristic shape of such units.

For a more detailed description of the invention, reference is made to the drawing in which numeral 10 designates a control device for use in conjunction with a pair of filters 12 and 14. Each of the filters 12 and 14 has a housing 16 with a cylindrical chamber 18 therein having a round cover 20 removably attached to the housing 16 by screws 22. A dependent plug 24, on the round cover 20, extends into the cylindrical chamber 18, and is provided with a downwardly disposed annular groove 26.

A resilient ring 28, seated around the top of the cylindrical chamber 18, enters into a sealing engagement with the round cover 20. A lateral seat 30 in the bottom of the cylindrical chamber 18 has a central opening 32 therein communicating with a threaded drain port 34 in the housing 18 sealed by a removable plug 36 secured with a jam nut 38. An intake port 40 and a discharge port 42 communicate respectively with the central opening 32 in the lateral seat 30 and the cylindrical chamber 18.

A tubular filtering cartridge 44 is supported on the lateral seat 30, and covered by a cap 46 held in position by a coil spring 48 secured in the annular groove 26 in the round cover 20. An elevated rim 47 around the lateral seat 30 holds the filtering cartridge 44 centrally disposed in the cylindrical chamber 18. A collector, having individual magnetic discs 50 separated by spacers 52, is supported in the filtering cartridge 44 by a screw 54 attached to the cap 46.

The control device 10 comprises a housing 56 having therein a switching unit 58, and a manual selector 60. The manual selector 60 comprises a chamber 62 communicating through ports 64 and 66 with intake openings 68 and 70 respectively in the housing 56. A threaded discharge opening 72 in the housing 56 communicates with the chamber 62 through a port 74. A cover 76 for the chamber 62, having an axial opening 78 therethrough, is removably attached to the housing 56 by screws 80. A boss 81 is provided on the top of the cover 76 coaxial with the opening 78. A dependent plug 77, on the cover 76, extends into the chamber 62, and is provided with a downwardly disposed annular recess 82, concentric with the axial opening 78.

A series of four equally spaced radial slots 83 are provided in the upper surface of the cover 76. A resilient ring 84, seated around the top of the chamber 62, enters into a sealing engagement with the cover 76. A control valve in the chamber 62, comprises a vertically disposed pivoted shaft 86, extending through the axial opening 78 in the cover 76, with a lateral finger 88 secured thereon by a screw 90. A resilient pad 92, of oil-resistant material such as neoprene, on the lower side of the finger 88, is held against lateral displacement by a pin 94. A coil spring 96, around the pivoted shaft 86, is seated in the annular recess 82 in the plug 77 of the cover 76.

An operator knob 98, having a medial groove 100 therearound, is detachably mounted on the pivoted shaft 86 by a screw 102. A transverse pin 104, through the pivoted shaft 86, slidably engages the boss 81 and seats in a diametral slot 106 in the operator knob 98. A vertically disposed locator pin 108, having a knurled gripping head 110 on the upper end, is slidably mounted in the operator knob 98 adjacent the outer edge. A coil spring 112, on the locator pin 108 intermediate the ends, yieldably urges the locator pin 108 into a holding engagement with the radial slots 83 in the cover 76.

The automatic switching unit 58 comprises a cylinder 114 communicating through ports 116 and 118 with threaded discharge oepnings 120 and 122 respectively in the housing 56. A threaded intake opening 124 in the housing 56 communicates with the cylinder 114 through a port 126. In an internal duct 127 in the housing 56 provides communication between the chamber 62 and the cylinder 114. A cover 128 for the cylinder 114, having an axial opening 130 therethrough, is removably attached to the housing 56 by countersunk screws 132. A boss 134 on top of the cover 128, co-axial with the opening 130, has on the upper surface thereof a pair of shallow diametral slots 136 at right angles to each other for receiving a transverse pin 137 extending through the pivoted shaft 150.

Figure 12:
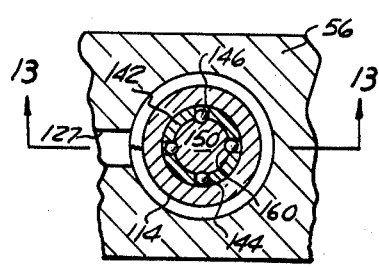
FIGURE 12 is a section view, taken substantially on plane 12—12 in FIGURE 4, showing the locking balls 146 slidably supported in the dependent sleeves 142.

A dependent plug 138 on the cover 128 extends into the cylinder 114, and is provided with an annular recess 140 concentric with the axial opening 130. A downwardly projecting sleeve 142 on the dependent plug 138 has therein four equally spaced radial openings 144, as shown in FIGURE 12. A locking ball 146 is slidably supported in each of the four radial openings 144 of the downwardly projecting sleeve 142. A resilient ring 148, seated around the top of the cylinder 114, enters into a sealing engagement with the cover 128.

A control valve in the cylindrical chamber 114 comprises a vertically disposed pivoted shaft 150, extending through the opening 130 in the cover 128, with a lateral finger 152 secured thereon by a screw 154. A resilient pad 156, of oil-resistant material, such as neoprene, on the lower surface of the finger 152, is held against lateral displacement by a pin 158. Four axial slots 160 are provided on the pivoted shaft 150 laterally disposed to the openings 144 in the downwardly projecting sleeve 142.

A lateral seating flange 162 is provided on the pivoted shaft 150 immediately above the lateral finger 152. A shoulder 164 on the pivoted shaft 150 supports a coil spring 166 seated in the annular recess 140 in the dependent plug 138 on the cover 128. A piston 168 is slidably supported on the downwardly projecting sleeve 142, and yieldably held in sealing engagement with the seating flange 162 by a coil spring 170 seated on the dependent plug 138 of the cover 128.

An annular groove 172 is provided on the inner periphery of the piston 168 adjacent the upper end. A resilient ring 174 around the lower end of the piston 168 enters into a sealing engagement with the walls of the cylinder 114. An operator head 176 for the switching unit 58 is mounted on the upper end of the pivoted shaft 150. The operator head 176 has an upright cup 178 seated on the cover 128 of the cylinder 114, and secured against angular displacement by pins 180 mounted in the cover. A laterally disposed slots 182 in the outer periphery of the upright cup 178 has in each end thereof, a circular enlargement 184.

An inverted cup 186, slidably supported in the upright cup 178, has therein a central opening 188, and a viewing opening 190 adjacent the outer edge. A spool 192 in the inverted cup 186 is axially recessed on the lower side to provide an internal shoulder 194 which seats on the boss 134 of the cover 128. A diametral slot 196 in the internal shoulder 194 receives the transverse pin 137 so as to lock the spool 192 on the pivoted shaft 150. A colored indicator dot 198 is provided on the spool 192 for use in conjunction with the viewing opening 190 in the inverted cup 186.

Figure 14:
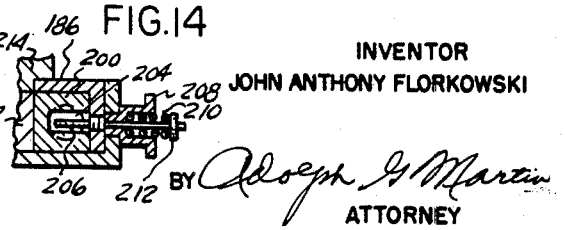
FIGURE 14 is an enlarged fragmentary section view, taken substantially on plane 14—14 in FIGURE 2, showing the button 204 on the drive spring 202 wound on the spool 192.

A "U" shaped stop 200, shown in FIGURE 14, is radially mounted in the spool 192 adjacent the outer edge. A drive spring 202, around the spool 192, has a button 204 on each end in seating engagement against the "U" shaped stop 200. A radial pin 206, threadably engaged in the inverted cup 186, has adjacent the outer end, a retractable knob 208 yieldably held in contact with the upright cup 178 by a spring 210 secured on the radial pin 206 by a keeper 212.

A retainer 214, secured to the pivoted shaft 150 by screws 216, removably holds the operator head 176 on the pivoted shaft 150. In practice, it may prove desirable in some installations to place the applicant's control device 10 in the same housing with the two filters 12 and 14 so as to avoid the necessity of interconnecting such units. However, this is a matter of choice, and will be dictated by the requirements peculiar to each installation and contemplated use.

The preceding discussion completes a description of the structural details of the applicant's invention; however, to facilitate a more thorough and comprehensive understanding of the subject matter herein presented, a discussion is next directed to the manner in which the device operates and is used to perform its intended function.

USE AND OPERATION

In use, the threaded intake opening 124 in the housing 56, is connected either to a tank or pump discharge, not shown, depending upon whether the hydraulic system is of the vacuum or pressure type. The threaded discharge opening 72 in the housing 56 is connected to the intake side of a pump, not shown, for delivery under pressure to the hydraulic system. The intake openings 40 of the two filters 12 and 14, are connected to the threaded discharge openings 120 and 122 in the housing, as shown in FIGURE 11, adjacent the automatic switching unit 58.

Figure 7:
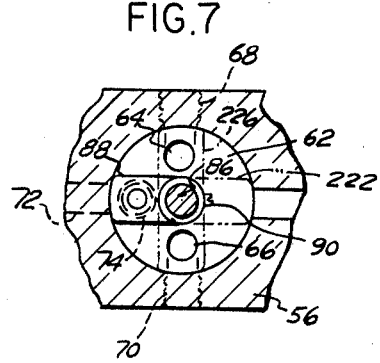
FIGURE 7 is a section view, taken substantially on plane 7—7 in FIGURE 4, showing the ports 64 and 66 in the chamber 62 of the manual selector 60.

The discharge openings 42 in the two filters 12 and 14 are connected to the threaded intake openings 68 and 70 in the housing 56, shown in FIGURES 1 and 2, adjacent the manual selector 60. With the applicant's control device 10 connected to the two filters 12 and 14, as described, and shown in FIGURES 1 and 2, the hydraulic system is operational. For the purpose of describing a complete operating cycle, it will be assumed that filter 12 is inactive and filter 14 is in operation. The lateral finger 88 in chamber 62 thus occupies the broken line position 22 as shown in FIGURE 7, so that hydraulic fluid may enter the port 74 and flow downwardly to the discharge opening 72.

Figure 11:
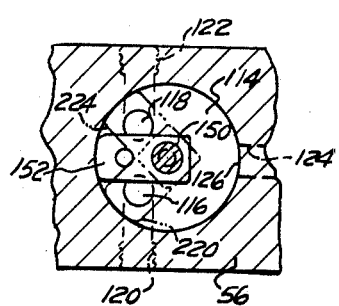
FIGURE 11 is a section view, taken substantially on plane 11—11 in FIGURE 4, showing the valve and the ports 116 and 118 in the cylinder 114 of the switching unit 58.

The lateral finger 152 must therefore be in the broken line position 220, as shown in FIGURE 11, so as to close the port 116 in the cylinder 114 in the automatic switching unit 58. Hydraulic fluid is thus directed from the intake opening 124 in the housing 56 through the port 118 and into the filter 14 through the intake port 40. The hydraulic fluid enters the central opening 32 in the housing 16 of the filter 14, and flows upward into the filtering cartridge 44 and outwardly through the openings therein to the cylindrical chamber 18.

From here the fluid enters the discharge port 42 and is directed into the manual selector 60 where it enters the chamber 62 through the intake opening 68 and port 64. As the lateral finger 88 occupies the broken line position 222 shown in FIGURE 7, hydraulic fluid enters the port 74 flowing downwardly to the threaded discharge opening 72 where it is directed to the pump intake for the hydraulic system, not here shown.

The flow of hydraulic fluid through the filter 14 continues until the acumulation of impurities and foreign materials on the inner surface of the filter cartridge 44 results in a pressure differential thereacross which produces a back pressure of sufficient magnitude to overcome the downward force exerted by the coil spring 170 on the piston 168 in the automatic switching unit 58. The piston 168 is thus driven upward until the internal annular groove 172 is aligned laterally with the locking balls 146 in the downwardly projecting sleeve 142.

Figure 8:
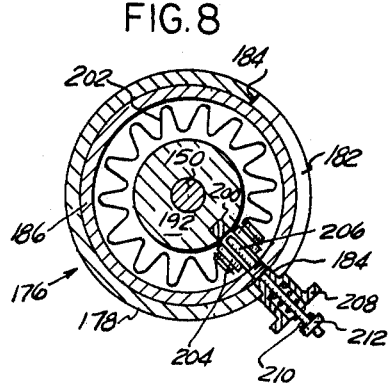
FIGURE 8 is a section view, taken substantially on plane 8—8 in FIGURE 4, showing structural details of the operator head 176 on the switching unit 58.
Figure 10:
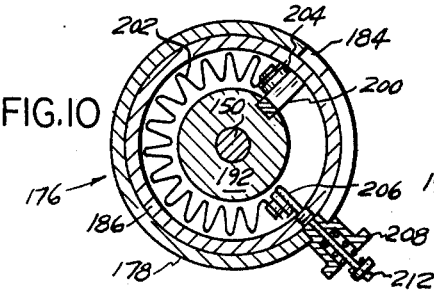
FIGURE 10 is an enlarged section view, similar to FIGURE 8, showing the drive spring 202 compressed, and the "U" shaped stop 200 in its alternate position.

The drive spring 202 in the operator head 176, which is in the full line position shown in FIGURE 10, exerts sufficient torque on the pivoted shaft 150 through the spool 192, to force the locking balls 146 outwardly into the internal annular groove 172 of the piston 168. The pivoted shaft 150 and spool 192 are then free, and proceed to turn 90 degrees in a clockwise direction to the full line position shown in FIGURE 8, thus shifting the lateral finger 152 to the broken line position 224 shown in FIGURE 11.

Figure 13:
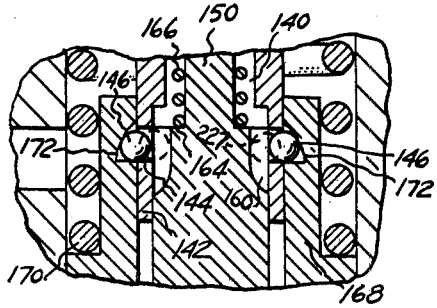
FIGURE 13 is an enlarged fragmentary section view, taken substantially on plane 13—13 in FIGURE 12, showing the locking balls 146 disengaged from the rotatable shaft 150.

The port 118 in the cylinder 114 is thereby closed and port 116 opened, thus directing hydraulic fluid from the automatic switching unit 58 through filter 12. The introduction of the clean filter 12, in the hydraulic circuit reduces the pressure differential across the filtering cartridge 44 so that the coil spring 170 in the automatic switching unit 58 can return the piston 168 to its position of rest on the lateral seating flange 162. As the piston 168 moves downward, it forces the locking balls 146 to the broken line position 227, shown in FIGURE 13, where they holdably engage the axial slots 160 in the pivoted shaft 150.

The colored indicator dot 198 on the spool 192 is now vertically aligned with the viewing opening 190, shown in FIGURE 2, thus indicating filter 14 is inactive. The filter cartridge 44 of filter 14 may then be cleaned by the simple expedient of removing the drain plug 36 in the housing 16, and turning the manual selector 60 so that the lateral finger 88 closes the discharge port 74 thereby directing pressurized hydraulic fluid in a reverse direction through the inactive filter 14.

The accumulated impurities are thus flushed from the interior surface of the filter cartridge 44 and out the drain opening 34 in the housing 16 of the inactive filter 14. If it is desired to replace the dirty filter cartridge 44, rather than clean it, the manual selector 60 may then be shifted so that the lateral finger 88 will occupy the broken line position 226 shown in FIGURE 7. Port 64 is thereby closed so that hydraulic fluid is prevented from entering the inactive filter 14, thus permitting the round cover 20 to be removed, and the filter cartridge 44 to be withdrawn and replaced.

Figure 9:
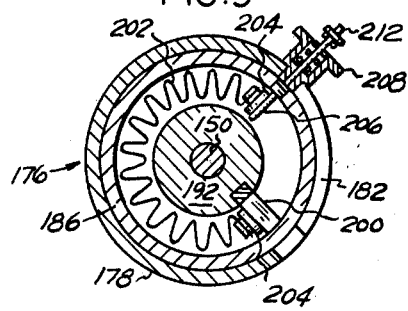
FIGURE 9 is a section view, similar to FIGURE 8, showing the drive spring 202 in the operator head 176 in a compressed position.

When the filter 14 has been re-assembled, the manual selector 60 is turned so as to place the lateral finger 88 in the broken line position 22, as shown in FIGURE 7. The retractable knob 208 on the operator head 176 is then withdrawn, and shifted couter-clockwise to the full line opsition shown in FIGURE 9, thereby again compressing the drive spring 202. This shift places the viewing opening 190 in the inverted cup 186 adjacent the active filter 12.

Thus when the pressure differential across the filter cartridge 44 in the active filter 12 exceeds a pre-selected magnitude, the piston 168 in the automatic switching unit 58 will again move upward in the cylinder 114. The pivoted shaft 150 and attached spool 192 is thereby unlocked and permitted to turn in a counter-clockwise direction so as to place the lateral finger 152 in the broken line position 220 shown in FIGURE 11, thus closing the port 116 and opening port 118 in the cylinder 114.

This shift of the pivoted shaft 150 and the attached spool 192 again brings the colored indicator dot 198 thereon into vertical alignment with the viewing opening 190 in the inverted cup 186 of the operator head 176. This indicates that the automatic switching unit 58 has withdrawn filter 12 from operation, and is now directing fluid flow through filter 14. Inactive filter 12 should then be cleaned or replaced in the manner previously described, and the operator head 176 again reset by withdrawing the retractable knob 208, and swinging it in a clockwise direction to the alternate or full line position shown in FIGURE 10.

This completes a description of the operating cycle which is repeated continuously without the necessity of withdrawing the applicant's control unit 10 from service or disrupting flow in the hydraulic circuit. Based upon the foregoing discussion, the applicant is of the opinion that his invention has fulfilled a long-felt need in the field of liquid filters, and that he has made a valuable contribution to the related art. However, while the invention was described with reference to the structural details of a single embodiment, it will be appreciated by those skilled in the art that the principels involved are susceptible of numerous other practical adaptations.

Therefore, I claim as new and desire to secure by Letters Patent:

1. A control device for alternately operating a pair of liquid filters each containing a filtering element and having a discharge port and an intake port, such device comprising a housing having therein a cylinder and a chamber in communication with each other, such housing also having therein a pair of discharge openings and pair of intake openings in communication respectively with the cylinder and chamber, a dscharge port in the housing communicating with the chamber, valve means in the chamber controlling communication between the discharge port and the pair of intake openings in the housing, means for selective operation of the valve means, an intake port in the housing communicating with the cylinder, means providing communication between the intake ports of the two filters and the pair of discharge openings in the housing, means providing communication between the discharge ports of the filters and the intake openings in the housing, a pivoted shaft in the cylinder, drive means for turning the pivoted shaft in the cylinder, valve means on the pivoted shaft controlling communication between the discharge openings in the housing and the cylinder, means in the cylinder for locking the pivoted shaft, and means in the cylinder controlling the locking means, such control means being actuated by a pre-selected pressure differential across the filtering element of the acting filter so as to release the locking means and allow the drive means to turn the pivoted shaft and shift the valve means thereon to stop flow through the acting filter and simultaneously direct such flow through the other filter.

2. The control device of claim 1 in which the means for locking the pivoted shaft in the cylinder comprises a dependent sleeve around the central portion of the pivoted shaft, and locking members slidably supported in the dependent sleeve movable into a holding engagement with the pivoted shaft.

3. The control device of claim 2 in which the means controlling the locking means comprises a piston slidable on the dependent sleeve having an advanced position and a retracted position in the cylinder, and resilient means yieldably holding the piston in its retracted position, such piston holding the locking members in engagement with the pivoted shaft when in a retracted position and releasing the locking members when in an advanced position in the cylinder.

4. The control device of claim 3 in which the piston has an annular groove on the inner periphery which is adapted to move the locking members inwardly as the piston moves to its retracted position, and receive such locking members so as to release the pivoted shaft when the piston is in its advanced position in the cylinder.

5. The control device of claim 4 in which the drive means for turning the pivoted shaft in the cylinder comprises a spool attached to the pivoted shaft, a resilient member around the spool, a case on the spool movably supported by the housing, means carried by the case for compressing the resilient member, and means on the housing for releasably engaging the compressing means.

6. The control device of claim 5 in which the valve means in the chamber comprises a pivoted shaft, a finger on the pivoted shaft, and a resilient member around the pivoted shaft holding the finger in a slidable sealing engagement with the bottom wall of the chamber.

7. The control device of claim 6 in which the means for selective operation of the valve means in the chamber comprises an operator knob on the pivoted shaft, and a locator pin slidably mounted in the operator knob for releasably holding the pivoted shaft in any assigned position.

References Cited

UNITED STATES PATENTS

| | | | |
|---|---|---|---|
| 2,940,517 | 6/1960 | Skellern | 210—333 X |
| 3,154,485 | 10/1964 | Lindell | 210—333 X |
| 3,388,799 | 6/1968 | Almer | 210—108 X |
| 3,396,843 | 8/1968 | Bouskill | 210—108 X |
| 3,397,784 | 8/1968 | Carr | 210—108 |

REUBEN FRIEDMAN, Primary Examiner

JOHN W. ADEE, Assistant Examiner

U.S. Cl. X.R.

210—333